Dec. 20, 1960     G. PEILSTÖCKER ET AL     2,964,794
BLOWN ARTICLES FROM HIGH MOLECULAR WEIGHT
THERMOPLASTIC POLYCARBONATES AND
METHOD OF MAKING SAME
Filed May 14, 1957

INVENTORS
Günter Peilstöcker
Wilhelm Hechelhammer
BY
Connolly and Hutz
ATTORNEYS

United States Patent Office 2,964,794
Patented Dec. 20, 1960

2,964,794

BLOWN ARTICLES FROM HIGH MOLECULAR WEIGHT THERMOPLASTIC POLYCARBONATES AND METHOD OF MAKING SAME

Günter Peilstöcker and Wilhelm Hechelhammer, Krefeld-Bockum, Germany, assignors to Farbenfabriken Bayer Aktiengesellschaft, Leverkusen, Germany, a corporation of Germany Filed May 14, 1957, Ser. No. 658,945

Claims priority, application Germany May 17, 1956

10 Claims. (Cl. 18—55)

Blown articles from thermoplastic synthetic materials may be produced according to known processes of extrusion. Blown articles, for example of polyethylene, cellulose esters and polyamides, are produced in such a manner that sections of the tubular melt leaving the extrusion machine are separated into two parts by a hollow mould and at the same time closed by welding the ends and subsequently blown and moulded by forcing in an inert gas. The masses adhere evenly to the cold or heated mould and the product may be removed from the mould in a very short period of time. Bottles, containers and hollow articles of any kind may be produced in this way.

Polyethylene yields opaque, soft, elastic blown articles having little resistance to heat.

Blown articles of cellulose esters have a good transparency, but less satisfactory mechanical properties and also a rather low resistance to heat, especially if they contain plasticisers as is usually the case.

Blown articles of polyamides, on the other hand, have good mechanical properties but cannot be produced completely transparent. They are, moreover, not sufficiently water-impermeable as to be suitable for many purposes for which they are intended. Bottles made of this material are not suitable, for example, for the storage of aqueous or alcoholic liquids.

It has now been found that blown articles of high molecular weight thermoplastic polycarbonates are distinctly superior in all their properties to blown articles hitherto used in practice.

They are completely transparent, have a very small water-absorption and therefore little permeability for water vapour, they have a high resistance to heat, to ageing, fastness to mineral acids even of high concentrations, and to water, good elasticity and resistance to the acquiring of a smell. Furthermore, they are very resistant to sterilizing, physiologically harmless, completely stain-repellent and do not contain any plasticizers.

Figure 1:
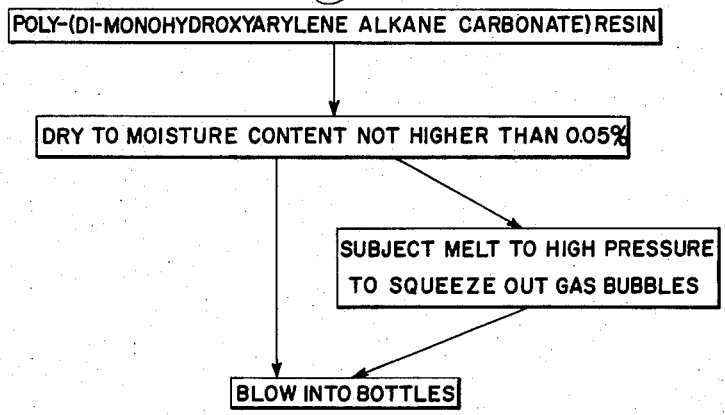
Figure 2:
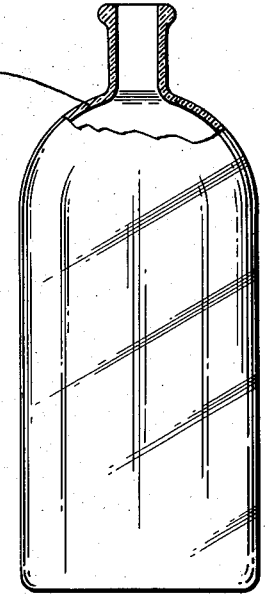

This invention will be more clearly understood by reference to the annexed drawings in which:

Fig. 1 is a flow sheet that diagrammatically represents the processes for making the blown article of the present invention; and Fig. 2 is a partially sectioned elevation view of a blown article representative of the present invention.

High molecular weight thermoplastic polycarbonates according to the invention may be produced of a great number of dihydroxy compounds, that is of aliphatic, cycloaliphatic and aromatic dihydroxy compounds.

For example there may be mentioned:

As aliphatic dihydroxy compounds: ethylene glycol, diethylene glycol, triethylene glycol, polyethylene glycol, thiodiglycol, ethylene dithiodiglycol, the di-, and polyglycols produced from propyleneoxide-1,2, o, m, or p-xylene glycol, propanediol-1,3, butanediol-1,3, butanediol-1,4, 2-methylpropanediol-1,3, pentanediol-1,5, 2-ethyl-propanediol-1,3, hexanediol-1,6, octanediol-1,8, 1-ethylhexanediol-1,3, and decanediol-1,10.

As cycloaliphatic dihydroxy compounds: cyclohexanediol-1,4, cyclohexanediol-1,2, 2,2-(4,4'-dihydroxy-dicyclohexylene)-propane and 2,6-dihydroxydecahydronaphthalene.

As aromatic dihydroxy compounds: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2-dihydroxydinaphthyl-1,1' and o, m, p-hydroxybenzylalcohol.

Preferred classes of aromatic dihydroxy compounds are the di-monohydroxy arylene sulphones and particularly the di-monohydroxy arylene alkanes, such as 4,4'-dihydroxydiphenylene sulphone, 2,2'-dihydroxydiphenylene sulphone, 3,3'-dihydroxydiphenylene sulphone, 4,4'-dihydroxy-2,2'-dimethyl-diphenylene sulphone, 4,4'-dihydroxy-3,3'-dimethyl-diphenylene sulphone, 2,2'-dihydroxy-4,4'-dimethyl-diphenylene sulphone, 4,4'-dihydroxy-2,2'-diethyldiphenylene sulphone, 4,4'-dihydroxy-3,3'-diethyldiphenylene sulphone, 4,4'-dihydroxy-2,2'-di-tert.butyldiphenyl sulphone, 4,4'-dihydroxy-3,3'-di-tert.butyl-diphenylene sulphone and 2,2'-dihydroxy-1,1'-dinaphthylene sulphone, furthermore 4,4'-dihydroxy-diphenylene-methane, 1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4' - dihydroxy - diphenylene) - (4 - methyl - phenylene)-methane,
(4,4' - dihydroxy - diphenylene) - (4 - ethyl - phenylene)-methane,
(4,4' - dihydroxy - diphenylene) - (4 - isopropyl - phenylene)-methane,
(4,4' - dihydroxy - diphenylene) - (4 - butyl - phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mm. mercury gauge),
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2 - (4,4' - dihydroxy - diphenylene) - decahydronaphthalene, (melting point 181° C.),
2,2 - (4,4' - dihydroxy - 3,3' - dicyclohexyl - diphenylene)-propane (melting point 144–146° C.),
2,2 - (4,4' - dihydroxy - 3 - methyl - diphenylene) - propane (melting point 114° C.),
2,2-(5,5'-dihydroxy-3-isopropyl-diphenylene)-butane,
1,1 - (4,4' - dihydroxy - 3,3' - dimethyl - diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane, 1,1 - (4,4' - dihydroxy - 3,3' - dimethyl - 6,6' - dibutyl-diphenylene)-butane,
1,1 - (4,4' - dihydroxy - 3,3' - dimethyl - 6,6' - di-tert.butyl-diphenylene)-ethane,
1,1 - (4,4' - dihydroxy - 3,3' - dimethyl - 6,6' - di-tert.butyl-diphenylene)-propane,
1,1 - (4,4' - dihydroxy - 3,3' - dimethyl - 6,6' - di-tert.butyl-diphenylene)-butane,
1,1 - (4,4' - dihydroxy - 3,3' - dimethyl - 6,6' - di-tert.butyl-diphenylene)-isobutane,
1,1 - (4,4' - dihydroxy - 3,3' - dimethyl - 6,6' - di-tert.butyl-diphenylene)-heptane,
1,1 - (4,4' - dihydroxy - 3,3' - dimethyl - 6,6' - di-tert.butyl-diphenylene)-1-phenyl-methane,
1,1 - (4,4' - dihydroxy - 3,3' - dimethyl - 6,6' - di-tert.butyl-diphenylene)-2-methyl-2-pentane,
1,1 - (4,4' - dihydroxy - 3,3' - dimethyl - 6,6' - di-tert.butyl-diphenylene)-2-ethyl-2-hexane, and
1,1 - (4,4' - dihydroxy - 3,3' - dimethyl - 6,6' - di-tert.amyl-diphenylene)-butane.

Among the great number of suitable di-monohydroxy arylene alkanes the 4,4'-dihydroxy-diphenylene alkanes are preferred, especially the 2,2-(4,4'-dihydroxy-diphenylene-propane and the 1,1-(4,4'-dihydroxy-diphenylene)-cyclohexane.

In some cases mixed polycarbonates prepared of at least two different dihydroxy compounds, especially such of at least one aromatic and at least one aliphatic dihydroxy compound, yield special properties.

In general it is advantageous that the polycarbonates have a relatively high molecular weight, they should have a K-value of at least 50 measured in a 0.5 percent solution in methylene chloride, especially a value from about 50 to about 65.

The high molecular weight thermoplastic polycarbonates may be produced by re-esterifying a dihydroxy compound of one of the groups mentioned above or a mixture of such dihydroxy compounds with a di-ester of carbonic acid, e.g. with the dimethyl-, diethyl-, dipropyl-, dibutyl-, diamyl-, dioctyl-, dicyclohexyl-, and especially with the diphenyl- and di-o, m, or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl-phenyl carbonate, particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

As di-esters of carbonic acid there also may be used dialkyl-, dicycloalkyl- or diaryl-dicarbonates of aromatic dihydroxy compounds, especially of the di-monohydroxy arylene alkanes. Such mixed bis-carbonates of dihydroxy compounds may be heated alone while the corresponding carbonic acid diester splits off. They also may be heated in mixture with dihydroxy compounds referred to.

The aforementioned dicarbonates of the aromatic dihydroxy compounds are easily obtainable e.g. by reacting the sodium salt of the aromatic dihydroxy compounds with 2 moles of an alkyl-, cycloalkyl-, or aryl-chlorocarbonate. Thus for example one obtains by reacting the sodium salt of 2,2-(4,4'-dihydroxy-diphenylene)-propane with phenyl chlorocarbonate in aqueous alkali medium, the bisphenyl carbonate of 2,2-di-(p-hydroxyphenylene)-propane, having the melting point 102–104° C., in practically quantitative yield.

For carrying out the process the following carbonates of aromatic dihydroxy compounds are suitable: bis-alkyl, e.g. bis-ethyl, bis-propyl, bis-isopropyl, bis-butyl, bis-amyl, bis-hexyl, bis-cycloalkyl, e.g. bis-cyclohexyl and bis-methylcyclohexyl, and bis-aryl, e.g. bis-phenyl, bis-cresyl, bis-cyclohexylphenyl, and bis-naphthyl carbonates of resorcinol, hydroquinone, 2,2-dihydroxytoluene, 2,5-dihydroxy-toluene, 3,5-dihydroxytoluene, 4,4'-dihydroxy-diphenyl, 2,4'-dihydroxydiphenyl, 4,4'-dihydroxy-3-cyclohexyl-diphenyl, 1,4-dihydroxynaphthalene, 1,6-dihydroxy-naphthalene, 2,6-dihydroxynaphthalene, 1,5-dihydroxy-anthracene, and of di-(mono-hydroxyarylene)-alkanes, in particular the 2,2-[diphenyl-(diphenylene)-dicarbonate]-propane. Mixtures of bis-carbonates of the di-monohydroxyarylene alkanes with monohydroxy compounds can also be used.

By heating these bis-alkyl, -cycloalkyl, or -aryl carbonates of the aromatic dihydroxy compounds, preferably under reduced pressure, one obtains, with separation of neutral alkyl, cycloalkyl, or aryl carbonates, a high molecular weight polycarbonate. If the said compounds are mixed with a dihydroxy compound, high molecular weight polycarbonates are obtained by inter-esterification. If, for example, one mole of the bis-phenyl carbonate of 2,2-di-(p-hydroxyphenylene)-propane is inter-esterified with one mole of 2,2-di-(p-hydroxyphenylene)-propane itself, the polycarbonate of the 2,2-di-(p-hydroxyphenylene)-propane is obtained accompanied by separation of phenol. This process has the advantage that the quantity of phenol split off per unit weight of polycarbonate formed is less than in other inter-esterification processes.

The re-esterifying process has to be carried out while excluding oxygen. We prefer to pass an inert-gas such as hydrogen, nitrogen, or carbon dioxide gas through the melt.

The re-esterification may be activated by re-esterifying catalysts, such as inorganic bases, for example, caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminum oxide, lead oxide, antimono-trioxide, cerium oxide, and boron oxide, acids, such as phosphoric acid and p-toluene sulphonic acid, and salts, such as sodium benzoate, calcium acetate, and boron phosphate, and alcoholates and phenolates.

When using basic catalysts mentioned above in the re-esterifying process it is advantageous to neutralise these basic catalysts towards the end of the esterification by adding base-binding materials to the melt. For this purpose a large variety of base-binding organic or inorganic substances can be added e.g. aromatic sulphonic acids such as p-tolyl sulphonic acid, organic acid halides such as stearyl chloride, butyryl chloride, benzoyl chloride, and toluene sulphochloride, organic chlorocarbonates such as phenyl chloroformate, p-hydroxy-diphenyl chloroformate, and bis-chloroformates of di-monohydroxy arylene alkanes, dialkylsulphates such as dimethyl sulphate and dibutyl sulphate, organic chlorine compounds such as benzoyl chloride and ω-chloroacetophenone as well as acid salts of polycondensation inorganic acids such as ammonium hydrogen sulphate.

Base-binding substances which are volatile under greatly reduced pressure at esterification temperatures are especially suitable since an incidental excess over that required to neutralise the basic catalysts can be easily removed from the melt. Dimethyl sulphate, phenylchloroformate and benzoyl chloride are examples of substances of this group.

After the neutralisation of the catalysts, the inter-esterification can if necessary be further continued to a limited extent for the attainment of a desired molecular weight.

The polycarbonates can also be produced by introducing phosgene into solutions of dihydroxy compounds or of mixtures of the aforesaid dihydroxy compounds in inorganic bases, such as dimethylaniline, diethylaniline, trimethylamine, and pyridine, or in indifferent organic solvents, such petrol, ligroin, cyclohexane, methylcyclohexane, benzene, toluene, xylene, chloroform, methylenechloride, carbon tetrachloride, trichloroethylene, dichloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The reaction conditions should be so that one mole of the phosgene reacts with one mole of the dihydroxy compounds. Suitable temperatures are from about 0° C. to 100° C.

Finally it is also possible to react bis-chloro-carbonates of dihydroxy compounds, with the aforementioned dihydroxy compounds. The condensation proceeds suitably in the presence of inert solvents, and acid-binding materials, e.g. tertiary amines.

When using phosgene or bis-chlorocarbonic acid esters as derivatives of the carbonic acid in producing polycarbonates catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammoniumhydroxide, triethyloctadecylammoniumchloride, trimethylbenzylammoniumfluoride, triethyl-benzylammoniumchloride, dimethyl-dodecylammoniumchloride, dimethylbenzyl-phenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Furthermore in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the endgroups of the polycarbonates consisting of the chlorocarbonic acid ester group and which terminate the chains, such as the phenols, for instance, the phenol, the tert.butylphenyl, the cyclohexylphenol, and 2,2-(4,4-hydroxyphenylene-4'-methoxyphenylene)-propane further aniline and methylaniline, it is possible to regulate the molecular weight of the polycarbonates in wide limits.

Typical processes for preparing high molecular weight polycarbonates mentioned above are described in the following example where the parts are by weight.

Example 1

A mixture of:

45.6 parts of 2,2-di-(p-hydroxyphenylene)-propane
47.1 parts of diphenylcarbonate and
0.008 part of lithium hydride is melted together under a nitrogen atmosphere with stirring at 110-150° C. The phenol which separates is distilled off by further heating to 210° C. under a pressure of 20 mm. mercury gauge. The pressure is then reduced to 0.2 mm. mercury gauge and the temperature raised for one hour to 250° C., and for two further hours to 280° C. At the end of the condensation the catalyst is neutralized by stirring 0.05 part of dimethylsulphate into the melt. The excess of neutralising agent is finally removed by further heating under reduced pressure. A viscous melt is obtained which solidifies to a thermoplastic material melting at 240° C.

Example 2

A mixture of 46.8 parts of bis-(phenylcarbonate) of 2,2-di-(p-hydroxyphenylene)-propane, 0.008 part of calcium hydride and 0.008 part of sodium benzoate is melted together under nitrogen and with stirring. The diphenyl carbonate split off is distilled off at 200° C. under a pressure of 2 mm. mercury gauge. After further heating to 280° C. at a pressure of 0.2 mm. mercury gauge the alkali catalyst is neutralised by stirring in 0.05 part of dimethyl sulphate. The mixture is then stirred for a further half an hour at 280° C. at 0.2 mm. mercury gauge pressure, whereby the excess of dimethyl sulphate is removed and a colorless high molecular weight thermoplastic polycarbonate is obtained which softens at about 230° C.

Example 3

Into a mixture of 137.6 parts of 2,2-(4,4'-dihydroxydiphenylene)-propane, 66.9 parts of caustic soda, 615 parts of water, 330 parts of methylenechloride, 0.12 part of sodium dithionite, and 0.1 part of p-tert. butylphenol, 71.5 parts of phosgene are introduced with stirring at about 25° C. during two hours. Then 3 parts of triethylbenzylammoniumchloride are added while continuing to stir the mixture at room temperature for about 2 hours. After this time the solution of the polycarbonate in the methylenechloride is highly viscous. After washing the mixture with water and evaporating the solvent a colorless, elastic plastic material is obtained. The K-value is 63.0 corresponding to an average molecular weight of 45,000. The theoretical average molecular weight is 47,700.

Example 4

To a mixture of 19.65 parts of 1,1-(4,4'-dihydroxydiphenylene)-cyclohexane-bis-chlorocarbonic acid ester and 12.86 parts of 1,1-(4,4'-dihydroxy-diphenylene)-cyclohexane dissolved in 350 parts of methylene chloride there is added drop by drop with stirring a solution of 11.85 parts of pyridine in 55 parts of methylene chloride at 0° C. over a period of 60 minutes. After the mixture is stirred at room temperature for several hours it is shaken out with water and dried. After evaporation of the solvent there remains a colorless clear tough plastic material with a softening point of 180° C.

Further special examples for producing high molecular weight thermoplastic polycarbonates are given in our co-pending applications Serial Nos. 461,938 filed October 12, 1954, 557,256 filed January 4, 1956, 572,793 filed March 21, 1956, 572,802 filed March 21, 1956, 596,398 filed July 9, 1956, and 614,340 filed October 8, 1956.

The blown articles according to the invention may be produced by methods known in the art per se as it is described in the first paragraph of this disclosure.

However for the present invention it is essential that the polycarbonate is dried to an extremely high extent before being worked up. It should have a water content not higher than about 0.05 percent. Therefore it is commendable to preheat the polycarbonate for instance in the form of a granulate for some hours at temperatures between about 80 and about 120° C. in a gas stream or under reduced pressure, particularly lower than one millimetre of mercury absolute.

It is furthermore advantageous to produce a relatively high pressure upon the melt, so that the gas-bubbles eventually risen in the melt are pressed out. Thus the pressure upon the melt before the nozzle should be at least 50 atmospheres. In general suitable pressures lie between about 70 and about 150 atmospheres.

The following example is given for the purpose of illustrating the invention.

*Example 5*

Poly-2,2-(4,4'-diphenyl)-propane carbonate of K-value 50 is blown in known manner to produce bottles. The bottles are sterilisable in conventional manner and suitable for example, for storing aqueous liquids, edible oils such as rape oils, milk, fruit juices, vinegar, wines, beer, spirits, mineral water and other beverages. They may also be used for the storage of perfumery articles of any kind such as are used for personal hygiene and cosmetics.

We claim:

1. A completely transparent blown bottle of high molecular weight thermoplastic linear film and fiber forming poly-(di-monohydroxy arylene alkane carbonate).

2. The combination of claim 1 in which the dimonohydroxy arylene alkane is a 4,4'-dihydroxy-diphenylene propane.

3. The combination of claim 1 in which the dimonohydroxy arylene alkane is a 4,4'-dihydroxy-diphenylene cyclohexane.

4. In the process of producing bottles by blowing sealed tubes of softened organic plastic material in a hollow mould, the improvement by which the plastic material is a high molecular weight, linear, thermoplastic, film and fibre forming poly-(di-mono-hydroxyarylene alkane carbonate), and before blowing the moisture content of the plastic material is reduced to no higher than 0.05%.

5. The combination of claim 4 in which the reduction of moisture content is carried out by heating particles of the polycarbonate between about 80 and about 180° C. in a stream of gas.

6. The combination of claim 4 in which the reduction of moisture content is carried out by heating particles of the polycarbonate between 80 and 180° C. while subjecting them to an absolute pressure lower than one millimeter of mercury.

7. In the process of producing bottles by blowing sealed tubes of softened organic plastic material in a hollow mould, the improvement by which the plastic material is a high molecular weight, linear, thermoplastic, film and fibre forming poly-(di-mono-hydroxyarylene alkane carbonate), and before blowing the moisture content of the plastic material is reduced to no higher than 0.05%, and the plastic material is subjected to superatmospheric pressure to squeeze out gas bubbles.

8. The combination of claim 7 in which the squeezing out of the gas bubbles is accomplished by subjecting the polycarbonate in molten condition to a pressure of at least 50 atmospheres.

9. The combination of claim 1, wherein the high molecular weight thermoplastic polycarbonate has a K-value of at least 50, measured in a 0.5 percent methylenechloride solution.

10. The combination of claim 1, wherein the high molecular weight thermoplastic polycarbonate has a K-value from about 50 to about 65, measured in a 0.5 percent methylenechloride solution.

References Cited in the file of this patent

UNITED STATES PATENTS

| | | |
|---|---|---|
| 2,579,390 | Mills | Dec. 18, 1951 |
| 2,669,752 | Pratt | Feb. 23, 1954 |
| 2,787,023 | Hager et al. | Apr. 2, 1957 |
| 2,789,966 | Reynolds et al. | Apr. 23, 1957 |
| 2,789,970 | Reynolds et al. | Apr. 23, 1957 |
| 2,804,654 | Sherman | Sept. 3, 1957 |

FOREIGN PATENTS

| | | |
|---|---|---|
| 532,543 | Belgium | Oct. 30, 1954 |

OTHER REFERENCES

Schnell: Angew Chemie, 68, p. 633–640. (Oct. 1956).